Oct. 3, 1961    S. E. MILLER    3,003,020
JOINING ASSEMBLY FOR WAVE GUIDE SECTIONS OR THE LIKE
Filed Dec. 19, 1958
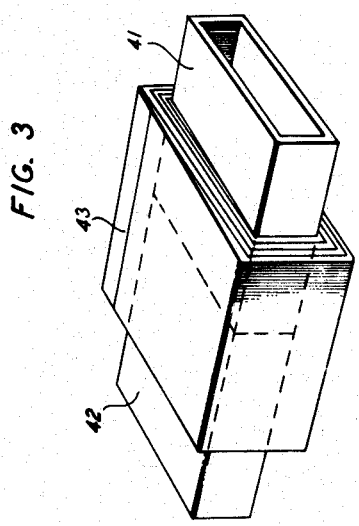
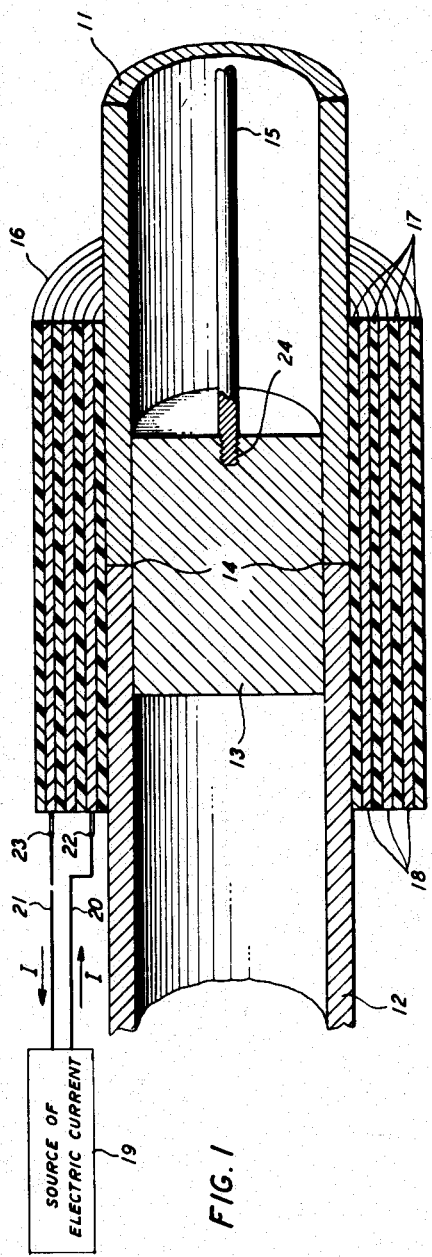
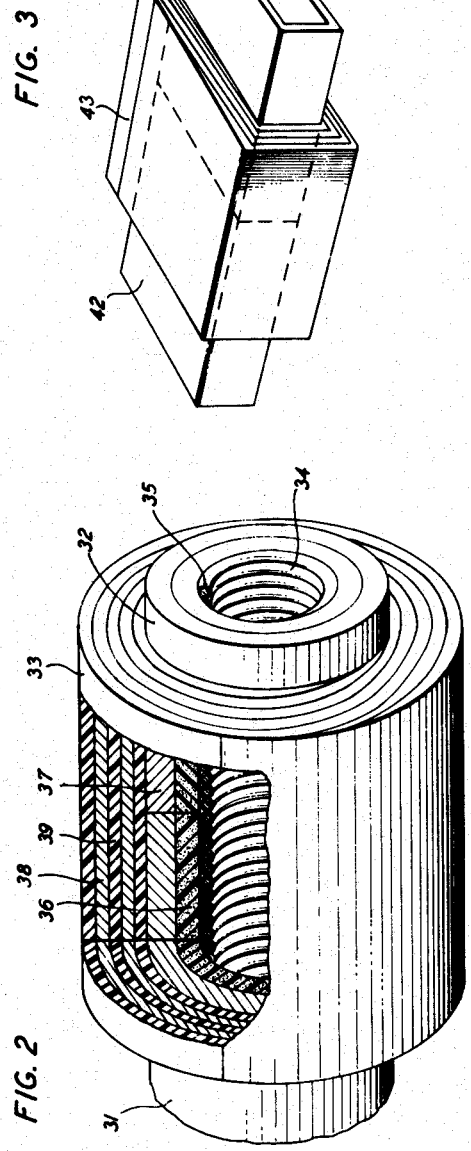
INVENTOR
S. E. MILLER
BY
ATTORNEY

United States Patent Office 3,003,020
Patented Oct. 3, 1961

3,003,020
JOINING ASSEMBLY FOR WAVE GUIDE SECTIONS OR THE LIKE
Stewart E. Miller, Middletown, N.J., assignor to Bell Telephone Laboratories, Incorporated, New York, N.Y., a corporation of New York
Filed Dec. 19, 1958, Ser. No. 781,604
3 Claims. (Cl. 174—84)

This invention relates to the art of connecting sections of wave transmission line such as wave guides and, more particularly, to methods and apparatus for aligning, coupling, and joining sections of such lines.

It is well known that sections of wave guide, and particularly those having circular cross sections in planes transverse to the direction of energy propagation therethrough, may be joined by providing the proper screw threads at the ends of each section. Alternatively, each section of wave guide may be manufactured with an integrally connected flange member at each of its ends for connection to a similar flange member of a succeeding section. The production of either flanges or screw threads, with their attendant close tolerances, adds considerably to the cost of wave guide apparatus. When the use of long sections of semipermanently continuous transmission line is contemplated, as in a long distance communication system utilizing wave guide links between repeater stations, the provision of machined connectors at every guide junction may not be economically justifiable.

Accordingly, it is an object of the present invention to join successive lengths of wave transmission line more economically than heretofore.

A more specific object is to join lengths of wave transmission line by thermosetting a sleeve surrounding the ends to be joined comprising layers of a continuous conductive medium interleaved with dielectric bonding layers, the thermosetting being effected through heating the sleeve by passing electric current from an external source through the conductive medium.

In accordance with the invention, the guides to be joined are suitably butted and aligned and are then wrapped in the vicinity of their butted ends with alternate layers of conductive material and dielectric material. The interleaved conductive and dielectric layers are impregnated with a plastic resin or other material of the type that may be changed from an initial fluid state to a final solid state by the process of heat curing or thermosetting. When an electric current is passed through the conductive portion of the sleeve, the sleeve itself is heated and the thermosetting process is initiated. After heating, the source of current is removed, the resin impregnated sleeve is allowed to cool, thereby completing the thermosetting process, and the means whereby the guides to be joined were aligned is removed. The guides are thus semipermanently joined by the cured resinous sleeve, with a substantial portion of the mechanical strength of the sleeve being provided by its conductive layers.

A feature of the invention is, therefore, the duality of purpose associated in such an embodiment with the conductive layers of the sleeve in serving two distinct functions. First, these conductive layers provide the path through which the heating current flows and serve as the heating element in the thermosetting process and second, they impart mechanical strength to the joint after the thermosetting process is completed.

The above and other objects, the nature of the present invention, its other features and advantages will appear more fully upon consideration of the specific illustrative embodiments shown in the accompanying drawing and described in detail below.

In the drawing:
FIG. 1 is a longitudinal cross sectional view of two wave transmission lines jointed in accordance with the present invention;
FIG. 2 is a partially broken away perspective view of a helix wave guide embodiment of the invention; and
FIG. 3 is a perspective view of a further application of the principles of the invention.

Referring now more particularly to the drawing, FIG. 1 shows an end portion of a first wave transmission line or guide 11, assumed to be of circular transverse cross section, which is to be joined to an end portion of a second wave transmission line or guide 12 of similar cross section. Inserted within the end portions of the guides to be joined is removable aligning mandrel 13. Mandrel 13 has an outside diameter slightly less than the inside diameter of guides 11, 12. This slight clearance not only facilitates insertion of the mandrel but allows for any thermal expansion of the mandrel of greater degree than the thermal expansion of guides 11, 12. Attached to mandrel 13 by means of threads 24 is rod 15 which serves to permit the insertion of mandrel 13 into the guides to be joined, to permit its positioning longitudinally at the junction 14 between the guides, and to permit its withdrawal after completion of the joining operation. Rod 15, therefore, has length greater than that of the guide section to be joined through which it is inserted.

Guides 11, 12 are surrounded in the vicinity of their end portions by sleeve 16. As illustrated in the cross sectional view of FIG. 1, sleeve 16 comprises alternate layers of material of different composition. Proceeding radially outward from the guide walls, dielectric layer 17 is first encountered, followed by conductive layer 18, and then alternately by other dielectric layers 17 and conductive layers 18. The conductive medium of which conductive layers 18 are a part is, in accordance with the present invention, a continuous element. That is, the conductive medium is wrapped around the wave guide ends and interleaved with the dielectric material in a continuous spiral outward from the guide surfaces. The conductive medium therefore provides, between its radially innermost and radially outermost layers, a spiral path for direct and low frequency electric currents introduced at one of these layers and received at the other. According to the principles of the present invention, current flowing in the spiral conductive medium is intended to be partially converted, through ohmic resistance losses, into heat energy and thereby raise the temperature of the sleeve itself. It is not necessary, however, that the ohmic resistance of the conductive medium be high. The major consideration in selecting the material for conductive layers 18 is mechanical strength. Thus, for example, ordinary galvanized mesh screening would be suitable for use as the conductive medium of the sleeve 16. In such a case, a high current passed through the screening at low terminal voltage would elevate the sleeve temperature sufficiently to effect the thermosetting process.

The dielectric layers 17, in addition to insulating adjacent conductive layers 18 from one another and from the conductive guides 11, 12, serve as the very important bonding and heat curing mechanism through which thermosetting of the sleeve and its resultant composite mechanical stiffness is obtained. One advantageous material which dielectric layers 17 may comprise is fiberglass impregnated with an epoxy resin for example. As a result of the thermosetting process, the epoxy resin will be changed from its initial fluid state to a final solid state, thereby forming a tight bond among the alternate dielectric and conductive layers 17, 18 and producing a sleeve 16 which is mechanically sufficiently strong to join the guides semipermanently.

In FIG. 1, current source 19 is attached to sleeve 16 at terminals 22, 23 through conductors 20, 21. Terminal 22 is attached to the spiral conductive member of sleeve 16 at its inner extremity with respect to the guides 11, 12, while terminal 23 is attached to the conductive spiral at its outer extremity. Thus current supplied by source 19 which enters sleeve 16 via conductor 20 will be constrained to flow spirally through the conductive wrapping member and be received by source 19 via conductor 21. Terminals 22, 23 allow easy connection and disconnection of source 19 and sleeve 16.

In accordance with a preferred method of practicing the invention, guides 11 and 12 are approximately aligned before mandrel 13 is inserted. The mandrel is then properly positioned at the end portions to be joined and these end portions are tightly wrapped with alternate layers of conductive screening and plastic resin impregnated fiberglass cloth. In order to prevent the short circuiting of the heating current to be applied after wrapping is completed, the sleeve should be wound such that an insulating layer of fiberglass separates the first conductive layer from the guide surfaces. It is convenient for the screening and the glass cloth to be wound around the guides simultaneously from continuous rolls and, therefore, the plastic resin may be suitably applied between turns as the winding progresses. Plastic resins suitable for application in the present invention include epoxide resins of the type that may be catalytically cured to form a thermosetting polymer. Terminal 22 may be created by placing a conductive member longitudinally with respect to the guides in contact with the screening within the first wrapping layer. A soldered connection between the conductive member and the screening may be provided if desired. The conductive member is permitted to extend beyond the sleeve at one end and this extension becomes terminal 22 for the connection of the external current source 19. The wrapping is continued until the sleeve 16 has the required radial thickness. This thickness is determined by the desirability of having the bending stiffness of the sleeve at least as great as the bending stiffness of the solid wall metallic guides joined by the sleeve in order that uniform deformation of the semi-permanently connected wave guide sections be experienced when subjected to bending forces. Otherwise, a concentrated bend would occur at the joint. When the sleeve has reached the desired thickness, wrapping is discontinued, again positioning a conductive member in contact with the outer conductive layer and permitting it to extend beyond the sleeve at one end to form terminal 23. The outer layer of the sleeve, like the inner layer, should comprise insulating material to prevent short circuiting problems. Accordingly, the fiberglass wrapping material may be continued for several turns after the conductive material has been terminated.

When construction of sleeve 16 is complete, an electrical source is connected between terminals 22, 23. Ohmic resistance presented to electric current flowing from the source 19 through the conductive layers of sleeve 16 will cause its temperature to rise. The length of time and degree of heat necessary for thermosetting depends upon the particular plastic resin chosen. As a specific example, galvanized mesh screening may be utilized as the conductive medium and Shell Chemical Corporation's Epon 815 with curing agent T may be utilized as the bonding or dielectric layers. The temperature of the sleeve should then be raised to a level of the order of 200 degrees Fahrenheit to accomplish thermosetting.

It should be noted that if the material of mandrel 13 is selected to have a thermal coefficient of expansion greater than that of the material of the guides to be joined, the heating process will cause mandrel 13 to expand tightly against their inside surfaces and to align their end portions precisely. This result will be achieved if, for example, the guides 11, 12 comprise copper and mandrel 13 comprises an aluminum alloy. Such a precise alignment is desirable in order that the butted wave guide ends present as small an impedance discontinuity to propagating wave energy as possible.

When the thermosetting process is completed the current source is disconnected from the terminals 22, 23 and the sleeve is allowed to cool. Mandrel 13 is removed after it has cooled and has shrunk away from the inside surfaces of guides 11, 12. As a result of the thermosetting process, the conductive layers of screening which served during the assembly process as conductors of electrical current and as heaters are laminated tightly with the glass cloth layers and are tightly bonded thereto with the polymerized resin. These conductive layers, therefore, form a mechanical component part of the cured joining sleeve and impart considerable strength to it. A laminated sleeve unit containing an interleaved mechanical strengthening member in accordance with the present invention is considerably more durable and stronger per unit radial thickness than laminated joining units not including the metallic medium. An additional advantage offered by the present invention, especially attractive from a practical viewpoint, is the relative ease with which the heating and thermosetting operations may be carried out by persons involved in installing and joining wave guide sections in actual field operations.

FIG. 2 illustrates a joining assembly in accordance with the invention as applied to helix type wave guides. Illustrated are butted and aligned end portions of helix guides 31, 32 surrounded by sleeve 33 including laminated conductive layers 38 and dielectric bonding layers 39. Helix guides 31, 32 comprise tightly wound helix 34, with adjacent turns insulated from each other by, for example, insulating coating 35 on the wires of the helix. Surrounding the helix is jacket 36 which dissipates electric field components propagating therein. Dissipative jacket 36 is encased in outer jacket 37 which may be a conductive pipe comprising, for example, steel or copper or which may be a nonconductive sheath comprising layers of glass cloth, or fiberglass, laminated together. The present invention is adapted to joining sections of helix wave guide of either construction. The helix-type wave guide offers many advantages over ordinary hollow conductive pipe for the transmission of energy in the circular electric or $TE_{01}$ mode configuration. Since the $TE_{01}$ mode is also attractive for long distance high frequency transmission, the desirability of having an economical means of joining sections of helix wave guide during installation of long distance helix wave guide connecting links between terminal points or repeater stations is obvious. The details of the application of the present invention to helix-type wave guides is substantially identical to that described above in connection with the hollow pipe wave guide embodiment of FIG. 1.

FIG. 3 illustrates an application of the principles of the present invention to wave guides of non-circular transverse cross section. Specifically, in FIG. 3 the end portions of guides 41, 42 of rectangular transverse cross section are joined by sleeve 43 which is built up and thermoset in accordance with the principles of the present invention as described above.

In installations in which the semipermanently continuous guide is to be subjected to highly corrosive surroundings or to destructive insects, it may be advisable to encase the entire laminated sleeve in a jacket of lead or other material which is impervious to such external influences.

In all cases it is understood that the above-described arrangements are illustrative of a small number of the many specific embodiments which could represent an application of the principles of the invention. Other arrangements can readily be devised in accordance with

What is claimed is:

1. A long length of semipermanently continuous transmission line comprising a plurality of sections of transmission line having lengths which are short relative to said long length, said sections being mechanically coupled substantially solely by sleeves surrounding the abutted end portions of each of said sections comprising a plurality of interleaved conductive and dielectric layers bonded with a thermoset resin, said conductive layers forming a continuous spiral conducting path for low frequency electric current introduced at one end of said spiral path and received at the other end of said path.

2. The method of semipermanently joining two lengths of hollow wave transmission line comprising the steps of placing an insert within the end portion of each of said two lengths to be joined to align said portions, wrapping said end portions a plurality of times in overlaying spiral fashion with a continuous conductive medium and simultaneously interposing a dielectric medium impregnated with a plastic resin between each layer of said spiral conductive medium, passing an electric current through said continuous conductive medium for a time to elevate the temperature of and to cure said plastic resin, and removing said insert.

3. A sleeve for joining the abutted end portions of transmission line sections comprising a plurality of alternate layers of conductive and dielectric media to be disposed over said end portions, said layers overlaying each other, said conductive media forming a continuously conductive spiral path for low frequency current between the innermost and the outermost ones of said conductive layers, said dielectric layers being impregnated with a thermosetting resin, and means for passing said current through said spiral path for a time to elevate the internal temperature of said sleeve, said conductive layers being adapted to remain in place to provide mechanical strength to said sleeve after thermosetting is completed.

References Cited in the file of this patent

UNITED STATES PATENTS

| | | |
|---|---|---|
| 2,340,926 | Bradley | Feb. 8, 1944 |
| 2,495,167 | Horstman et al. | Jan. 17, 1950 |
| 2,695,853 | Foreit | Nov. 30, 1954 |
| 2,719,274 | Luhrs | Sept. 27, 1955 |
| 2,795,523 | Cobb et al. | June 11, 1957 |
| 2,797,394 | Clogston | June 25, 1957 |

FOREIGN PATENTS

| | | |
|---|---|---|
| 120,846 | Australia | Jan. 10, 1946 |
| 217,080 | Australia | Nov. 15, 1956 |
| 502,328 | Italy | Mar. 1956 |